United States Patent
Nagai (10) Patent No.: US 10,160,426 B2
(45) Date of Patent: Dec. 25, 2018

(54) DRIVER MONITORING DEVICE

(71) Applicant: DENSO CORPORATION, Kariya, Aichi-pref. (JP)

(72) Inventor: Fumiya Nagai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 12 days.

(21) Appl. No.: 15/324,015

(22) PCT Filed: Jul. 27, 2015

(86) PCT No.: PCT/JP2015/003742
§ 371 (c)(1),
(2) Date: Jan. 5, 2017

(87) PCT Pub. No.: WO2016/021142
PCT Pub. Date: Feb. 11, 2016

(65) Prior Publication Data
US 2017/0210357 A1    Jul. 27, 2017

(30) Foreign Application Priority Data
Aug. 8, 2014   (JP) .................................. 2014-162875

(51) Int. Cl.
*G06K 9/00* (2006.01)
*B60T 7/14* (2006.01)
(Continued)

(52) U.S. Cl.
CPC .................. *B60T 7/14* (2013.01); *B60C 9/00* (2013.01); *B60K 28/06* (2013.01); *B60R 1/00* (2013.01);
(Continued)

(58) Field of Classification Search
None
See application file for complete search history.

(56) References Cited

U.S. PATENT DOCUMENTS 5,689,241 A * 11/1997 Clarke, Sr. ............... A61B 5/18
340/575
6,049,747 A * 4/2000 Nakajima .............. B60N 2/002
340/576
(Continued)

FOREIGN PATENT DOCUMENTS

| | | |
|---|---|---|
| CN | 103796892 A1 | 5/2014 |
| JP | H10000960 A | 1/1998 |

(Continued)

*Primary Examiner* — Shervin Nakhjavan
(74) *Attorney, Agent, or Firm* — Harness, Dickey & Pierce, P.L.C.

(57) ABSTRACT

A driver monitoring device is provided. The driver monitoring device includes a detection unit that detects an unbalanced posture of a driver based on an image of a driver's seat of a vehicle captured by a camera; a determination unit that determines whether or not the unbalanced posture of the driver detected by the detection unit is a habitual posture of the driver; and a notification unit that notifies the driver of the unbalanced posture in different manners in accordance with whether the unbalanced posture determined is the habitual posture of the driver or the unbalanced posture determined is other than the habitual posture of the driver.

8 Claims, 6 Drawing Sheets

(51) Int. Cl.
  *B60K 28/06* (2006.01)
  *G08B 21/06* (2006.01)
  *B60C 9/00* (2006.01)
  *B60R 1/00* (2006.01)
(52) U.S. Cl.
  CPC ..... *G06K 9/00617* (2013.01); *G06K 9/00845* (2013.01); *G08B 21/06* (2013.01); *B60K 2350/106* (2013.01); *B60K 2350/1076* (2013.01); *B60K 2350/2013* (2013.01); *B60R 2300/103* (2013.01); *B60R 2300/105* (2013.01); *B60R 2300/30* (2013.01); *B60R 2300/8006* (2013.01); *B60T 2220/02* (2013.01)

(56) References Cited

U.S. PATENT DOCUMENTS

| | | | | |
|---|---|---|---|---|
| 2008/0080741 A1* | 4/2008 | Yokoo | ............. | B60W 40/09 382/104 |
| 2008/0130953 A1* | 6/2008 | Ishikawa | ............. | G06K 9/00369 382/103 |
| 2010/0090839 A1* | 4/2010 | Omi | ............. | B60K 28/04 340/575 |
| 2011/0178680 A1* | 7/2011 | Kato | ............. | B60N 2/002 701/41 |
| 2011/0295466 A1* | 12/2011 | Ostu | ............. | B60N 2/002 701/45 |
| 2013/0009761 A1 | 1/2013 | Horseman | | |
| 2013/0009993 A1 | 1/2013 | Horseman | | |
| 2013/0011819 A1 | 1/2013 | Horseman | | |
| 2013/0012786 A1 | 1/2013 | Horseman | | |
| 2013/0012787 A1 | 1/2013 | Horseman | | |
| 2013/0012788 A1 | 1/2013 | Horseman | | |
| 2013/0012789 A1 | 1/2013 | Horseman | | |
| 2013/0012790 A1 | 1/2013 | Horseman | | |
| 2013/0012802 A1 | 1/2013 | Horseman | | |
| 2013/0013327 A1 | 1/2013 | Horseman | | |
| 2013/0013331 A1 | 1/2013 | Horseman | | |
| 2013/0338881 A1* | 12/2013 | Sato | ............. | G08G 1/166 701/45 |
| 2014/0019165 A1 | 1/2014 | Horseman | | |
| 2014/0025396 A1 | 1/2014 | Horseman | | |
| 2014/0025397 A1 | 1/2014 | Horseman | | |
| 2014/0025936 A1 | 1/2014 | Morikawa | | |
| 2014/0121927 A1* | 5/2014 | Hanita | ............. | B60T 7/14 701/70 |
| 2014/0163330 A1 | 6/2014 | Horseman | | |
| 2014/0163331 A1 | 6/2014 | Horseman | | |
| 2014/0163332 A1 | 6/2014 | Horseman | | |
| 2014/0163333 A1 | 6/2014 | Horseman | | |
| 2014/0163335 A1 | 6/2014 | Horseman | | |
| 2014/0163336 A1 | 6/2014 | Horseman | | |
| 2014/0163337 A1 | 6/2014 | Horseman | | |
| 2015/0012186 A1 | 1/2015 | Horseman | | |
| 2015/0166059 A1* | 6/2015 | Ko | ............. | B60W 30/09 701/28 |

FOREIGN PATENT DOCUMENTS

| | | |
|---|---|---|
| JP | 2007280061 A | 10/2007 |
| JP | 2008122149 A | 5/2008 |
| JP | 2011238133 A | 11/2011 |
| JP | 2014044707 A | 3/2014 |

\* cited by examiner

| Proper driving posture | |
|---|---|
| A: Be seated facing front and adjust the position of the back so as to keep the back supporting you during driving. | |
| B: Adjust the seat position such that you can firmly step on the pedals and such that, when you grasp the steering wheel, your elbows are slightly bent. | |
| C: Make sure that the center in height of the headrest is around the upper ends of your ears. | |
| D: Wear the seat belt correctly. | |

DRIVER MONITORING DEVICE

CROSS REFERENCE TO RELATED APPLICATIONS

This application is a U.S. National Phase Application under 35 U.S.C. 371 of International Application No. PCT/JP2015/003742 filed on Jul. 27, 2015 and published in Japanese as WO 2016/021142 A1 on Feb. 11, 2016. This application is based on and claims the benefit of priority from Japanese Patent Application No. 2014-162875 filed on Aug. 8, 2014. The entire disclosures of all of the above applications are incorporated herein by reference.

TECHNICAL FIELD

The present disclosure relates to a driver monitoring device for monitoring a vehicle driver.

BACKGROUND ART

A monitoring device have been proposed which determines whether or not a driver is in a dangerous state, for example, looking aside or drowsing, and which alerts the driver when the driver is determined to be in a dangerous state. For example, the driver monitoring device disclosed in Patent Literature 1 determines, based on an image taken by photographing a pattern of bright spots projected on the face of a driver, angles of inclination of the driver's face when the driver turns his/her face up or down or left or right or when the driver otherwise inclines his/her face. Based on the angles of inclination of the driver's face determined, the device disclosed in Patent Literature 1 determines whether or not the driver is in a dangerous state, for example, looking aside or drowsing and, when the driver is determined to be in a dangerous state, alerts the driver.

PRIOR ART LITERATURES

Patent Literature

Patent Literature 1: JP H10-960A

SUMMARY OF INVENTION

According to the studies made by the inventor of the present application, in the case of the device disclosed in Patent Literature 1, a driver may possibly be determined to be in a dangerous state and be alerted not only when the driver's posture is found unbalanced, for example, with the driver looking aside or drowsing but also when the driver is in his/her habitual unbalanced posture.

An object of the present disclosure is to provide a driver monitoring device that can provide a driver with appropriate notification corresponding to the unbalanced posture of the driver.

In an example of the present disclosure, a driver monitoring device comprises: a detection unit that detects an unbalanced posture of a driver based on an image of a driver's seat of a vehicle captured by a camera; a determination unit that determines whether or not the unbalanced posture of the driver detected by the detection unit is a habitual posture of the driver; and a notification unit that notifies the driver of the unbalanced posture in different manners in accordance with whether the unbalanced posture determined is the habitual posture of the driver or the unbalanced posture determined is other than the habitual posture of the driver.

According to the above driver monitoring device, an unbalanced posture of a driver is detected based on a camera-captured image and whether or not the detected unbalanced posture of the driver is a habitual posture of the driver is determined. When the unbalanced posture is a habitual posture of the driver, the action to be taken may be of lower urgency than when the unbalanced posture is other than a habitual posture of the driver, but the driver may be preferably urged to improve his/her unbalanced posture. Thus, notifications about the unbalanced postures of the driver are given to the driver in different manners in accordance with whether the unbalanced posture is a habitual posture of the driver or the unbalanced posture is other than a habitual posture of the driver. In this way, it is possible to provide a driver with appropriate notification corresponding to the driver's unbalanced posture.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

In the following, an embodiment of a driver monitoring device will be described with reference to drawings.

Figure 1:
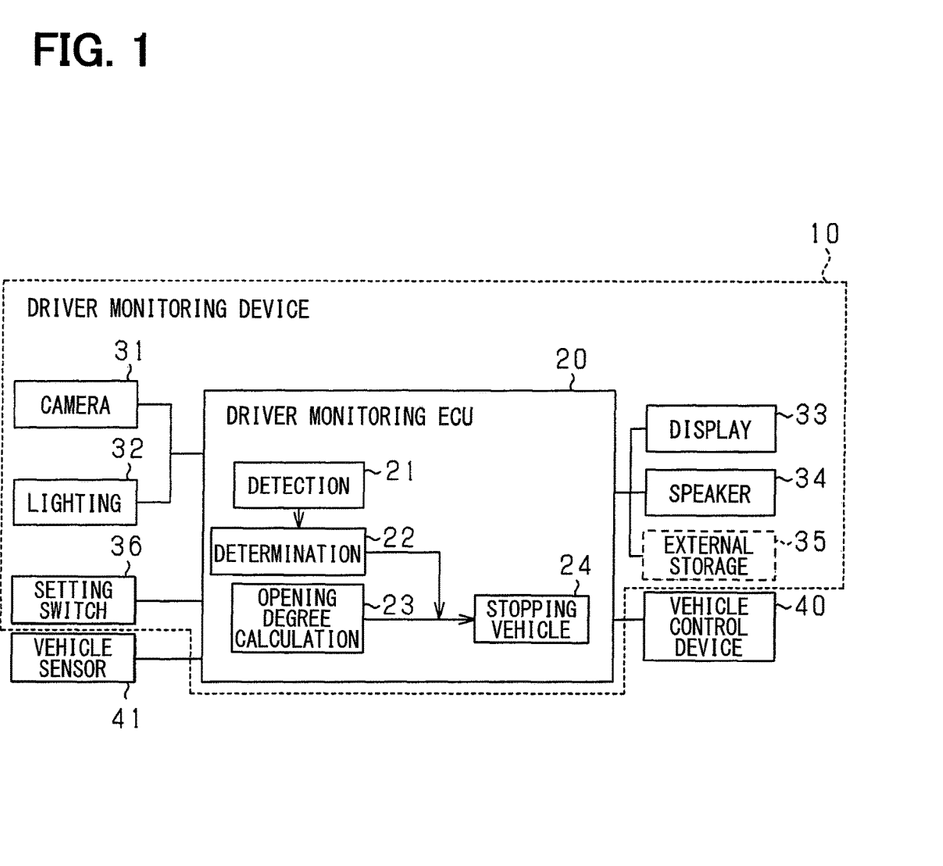
FIG. 1 is a diagram illustrating a configuration of a driver monitoring device.
Figure 2:
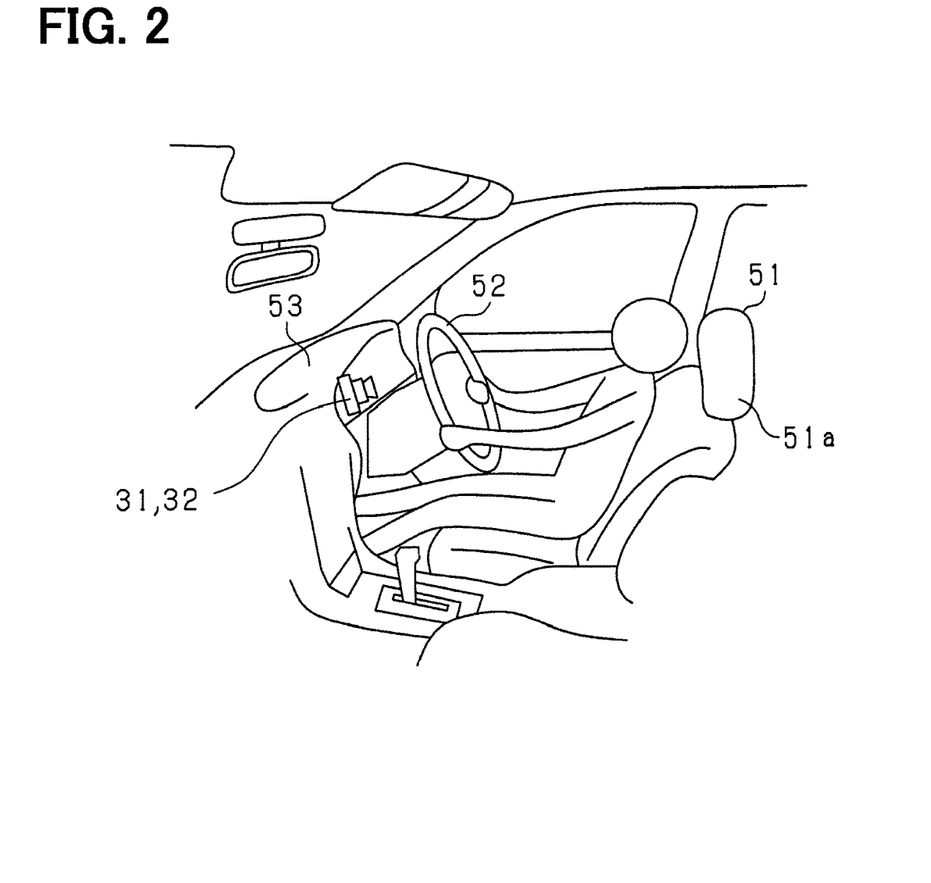
FIG. 2 is a diagram illustrating a vehicle interior where the driver monitoring device is installed.

First, the configuration of a driver monitoring device 10 of the present embodiment will be described with reference to FIGS. 1 and 2. The driver monitoring device 10 includes a driver monitoring ECU 20, a camera 31, lighting 32, a setting switch 36, a display 33 and a speaker 34.

The camera 31 is, for example, a CCD camera having a high sensitivity characteristic in a near-infrared region. The lighting 32 including, for example, near-infrared LEDs is for emitting near-infrared light and is installed near the camera 31. The camera 31 is, as shown in FIG. 2, installed in a meter hood 53 and photographs the driver's seat of the vehicle illuminated by the lighting 32. To be specific, the lighting 32 emits near-infrared light toward around a head rest 51a of a driver's seat 51 and the camera 31 photographs an area around the headrest 51a illuminated by the lighting 32. Namely, when a driver is seated on the driver's seat, the camera 31 photographs the driver's face and its periphery. Every time the camera 31 captures one frame of image data, the camera 31 sends the image data to the driver monitoring ECU 20. As long as the driver's face and its periphery can be photographed, the camera 31 may be installed over the dashboard or on the steering column or on an A-pillar. Also, the camera 31 may include plural cameras and such plural cameras may be installed in different locations.

The driver monitoring ECU 20 is a microcomputer having, for example, a CPU, an ROM, an RAM and I/O parts and realizes such functions as a detection unit 21, a determination unit 22, an opening degree calculation unit 23 and a vehicle stopping unit 24. The driver monitoring ECU 20 adjusts the amount of light of the lighting 32 depending on the time of day so as to facilitate photographing of the driver's face. Each of the above functions will be described in the following. The detection unit 21 corresponds to an example of detection means. The determination unit 22 corresponds to an example of determination means. The opening degree calculation unit 23 corresponds to an example of opening degree calculation means. The vehicle stopping unit 24 corresponds to an example of vehicle stopping means.

Figure 3:
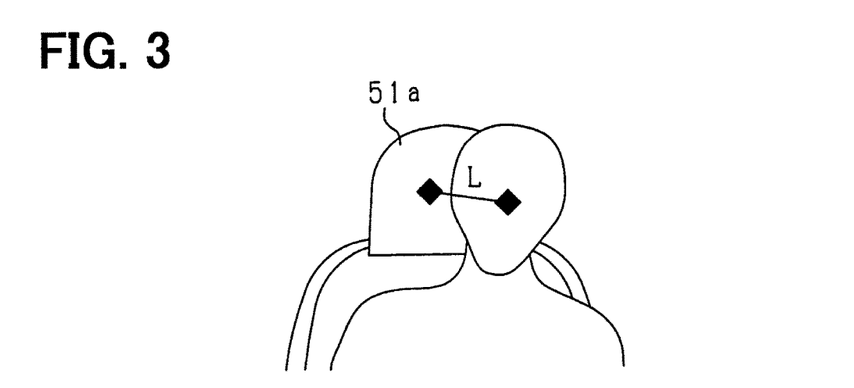
FIG. 3 is a diagram illustrating an example of a posture unbalance magnitude.

The detection unit 21 detects an unbalanced posture of a driver based on an image captured by the camera 31. To be specific, the detection unit 21 recognizes an image captured by the camera 31 and calculates magnitude L of the driver's posture unbalance. The posture unbalance magnitude L may be defined appropriately. For example, as shown in FIG. 3, the distance between the center of the head rest 51a set as a reference point and the center of the driver's face may be defined as the posture unbalance magnitude L. Instead of the center of the head rest 51a, the center of the steering wheel 52 may be set as a reference point. Alternatively, the center of the face of the driver who is seated in a proper posture on the driver's seat so as to face forward may be set as a reference point, and the distance between this reference point and the center of the driver's face in the captured image may be regarded as the posture unbalance magnitude L.

When the posture unbalance magnitude L is larger than threshold Th, the detection unit 21 detects the driver's posture as an unbalanced posture. The threshold Th is set, for example, to be a threshold for allowing proper and effective operation of an airbag at the time of a collision. In this case, the threshold Th is set to such a value that when the posture unbalance magnitude L is larger than the threshold Th, the proper and effective operation of an airbag is difficult. The airbag may be, for example, a driver seat airbag to be deployed over the steering wheel 52 or a side airbag to be deployed between the seat 51 and a door panel. In the case of a driver seat airbag, for example, when the driver's head projected on the upper surface of the steering wheel 52 is not inside an airbag deployment area, the airbag cannot be properly effective at the time of a collision. Also, when the distance between the airbag and the driver's head is too short, deployment of the airbag subjects the driver's head to a strong impact. This prevents the airbag from being properly effective at the time of a collision. The threshold Th may be set to be appropriate for the location where the airbag is installed and the size of the airbag. Different thresholds Th may be set for different directions of posture unbalance, i.e. for different directions of posture shifting from a proper driving posture.

Figure 4A:
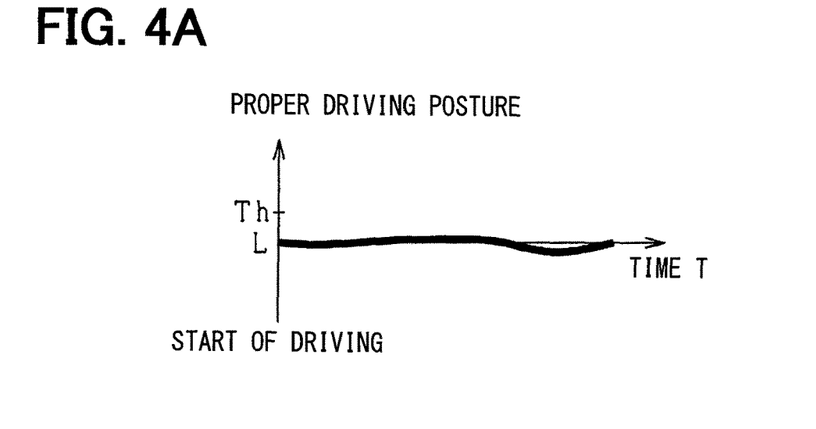
FIG. 4A is a diagram illustrating variation with time of the magnitude of posture unbalance of a driver in a proper posture.
Figure 4B:
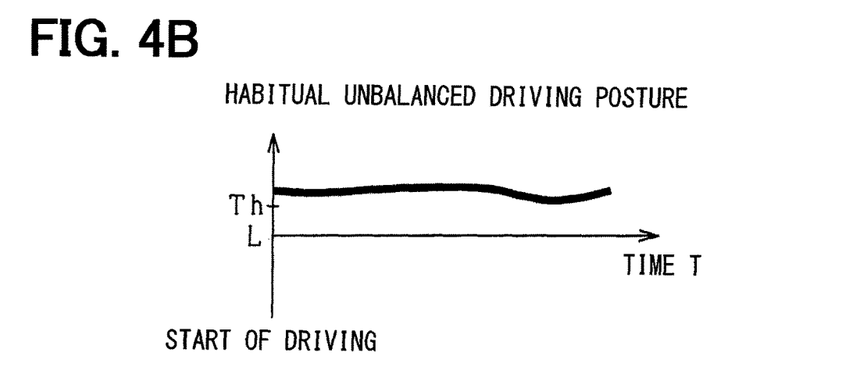
FIG. 4B is a diagram illustrating variation with time of the magnitude of posture unbalance of a driver in a habitual unbalanced posture.
Figure 4C:
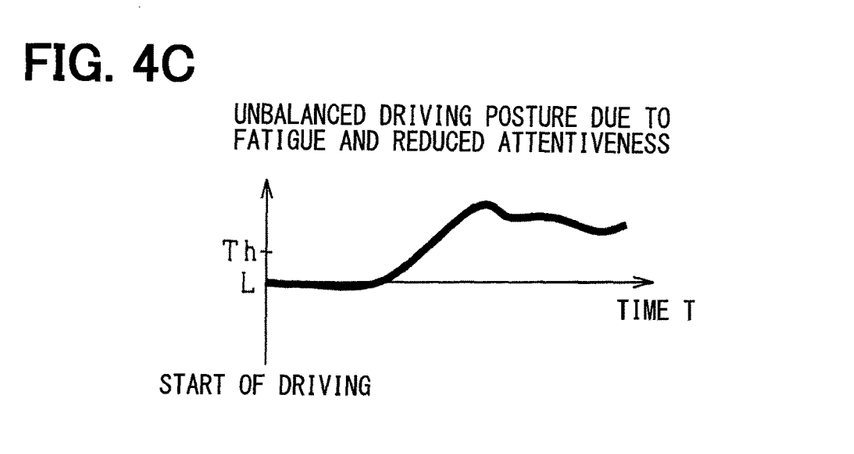
FIG. 4C is a diagram illustrating variation with time of the magnitude of posture unbalance of a driver in an unbalanced posture due to fatigue or reduced attentiveness.

The determination unit 22 determines whether or not a driver's unbalanced posture detected by the detection unit 21 is a habitual posture of the driver. As shown in FIG. 4A, when a driver is in a proper posture, the posture unbalance magnitude L is smaller than the threshold Th. Also, as shown in FIG. 4B, when a driver's posture is habitually unbalanced, the posture unbalance magnitude L is kept larger than the threshold Th continuously from immediately after start of driving. Also, as shown in FIG. 4C, when a driver's unbalanced posture is due to fatigue or reduced attentiveness of the driver, the posture unbalance magnitude L increases with time although the posture unbalance magnitude L is small immediately after the start of driving. In this case, after exceeding the threshold Th, the posture unbalance magnitude L stays being larger than the threshold Th. When a driver's unbalanced posture is a habitual posture of the driver, it is not necessary to immediately alert the driver. However, when the driver stays in an unbalanced posture, his/her fatigue easily accumulates, so that it is desirable to urge the driver to correct his/her posture. When a driver's unbalanced posture is due to fatigue or reduced attentiveness of the driver, the unbalanced posture may lead to an accident, so that it is necessary to immediately alert the driver and urge the driver to take a rest.

When a driver's unbalanced posture is continuously detected longer than time T1 (posture unbalance determination time) from immediately after driving is started (from within a predetermined time after driving is started), the determination unit 22 determines that the unbalanced posture is a habitual posture of the driver. Also, when the posture unbalance magnitude L exceeds the threshold Th by increasing with time after being initially not larger than the threshold Th, the determination unit 22 determines that the unbalanced posture is due to fatigue or reduced attentiveness of the driver, namely, that the unbalanced posture is other than a habitual posture of the driver. Or, when, after driving is started and a predetermined amount of time elapses, an unbalanced posture of the driver is continuously detected by the detection unit 21 longer than the time T1, the determination unit 22 determines that the unbalanced posture is other than a habitual posture of the driver.

When the determination unit 22 determines that an unbalanced posture of the driver is a habitual posture of the driver, the determination unit 22 instructs the display 33 and the speaker 34 to output posture information at predetermined timing. When the determination unit 22 determines that an unbalanced posture of the driver is other than a habitual posture of the driver, the determination unit 22 instructs the display 33 and the speaker 34 to immediately alert the driver. When the posture unbalance magnitude L after sharply increasing to over the threshold Th decreases to or below the threshold L before the time T1 elapses, the driver is supposed to have regained a proper posture, for example, after once looking aside, so that it is not necessary to notify the driver of the unbalanced posture.

In cases where, after the unbalanced posture of a driver is determined to be other than a habitual posture of the driver and the driver is alerted, the driver's posture remains unimproved and the driver's eyes are closed, the driver is feared to be unconscious and be unable to drive. Hence, the opening degree calculation unit 23 recognizes an image captured by the camera 31 and calculates the degree of opening of the driver's eyes. The degree of opening of an eye is calculated based on the distance between the opposing edges of the top and bottom lids of the eye. When, after an unbalanced posture of the driver is determined to be other than a habitual posture of the driver and the driver is alerted, the driver's posture is not improved and the driver's eyes are determined to be closed, the vehicle stopping unit 24 sends a signal for safely stopping the vehicle to a vehicle control device 40. The vehicle stopping unit 24 determines that the driver's eyes are closed, when the driver's eye opening degree calculated by the opening degree calculation unit 23 remains smaller than threshold Tho (opening degree threshold) longer than time T2 (opening degree determination time).

The display 33 (corresponding to a notification unit and an example of notification means) is, for example, a display of an in-vehicle information terminal or an in-vehicle display installed in a meter panel. The display 33 may be a touch display having an LCD panel or an organic EL panel. The speaker 34 (corresponding to a notification unit and an example of notification means) is an in-vehicle speaker used, for example, along with an in-vehicle information terminal and an in-vehicle audio device. The display 33 and the speaker 34 notify the driver of an unbalanced posture in different manners in accordance with whether the determination unit 22 determines that the unbalanced posture is a habitual posture of the driver or the determination unit 22 determines that the unbalanced posture is other than a habitual posture of the driver.

To be specific, when an unbalanced posture of the driver is a habitual posture of the driver, the display 33 and the speaker 34 output posture information at predetermined timing. The posture information is for urging the driver to correct his/her posture and preferably includes information either about a proper driving posture or about effects of the unbalanced posture. When the predetermined timing is set to be when the vehicle is stopped, more posture information can be safely outputted than when the vehicle is running. When an unbalanced posture of the driver is not a habitual posture of the driver, the display 33 and the speaker 34 immediately alert the driver.

The setting switch 36 (corresponding to a setting unit and an example of setting means) is for use by a driver to set the frequency of output of posture information. The setting switch 36 may be a mechanical switch or a touch switch formed integrally on the display 33. Depending on the driver, frequent outputs of posture information after detection of a habitual unbalanced posture of the driver may be annoying. The setting switch 36 allows such a driver to set a desired frequency of posture information output, for example, to have posture information outputted only once in a trip of driving or once in several hours.

Figure 5:
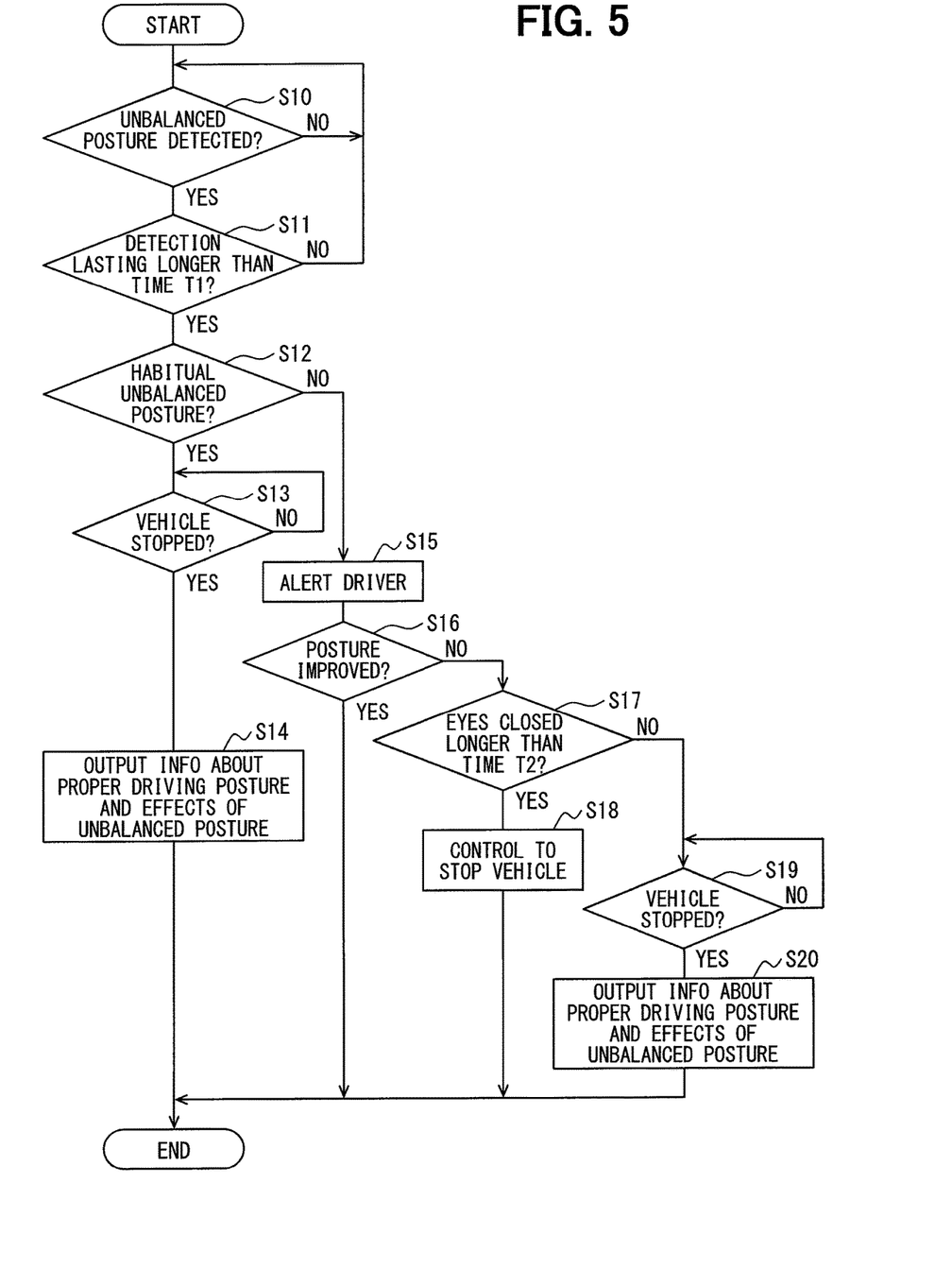
FIG. 5 is a flowchart of a procedure for posture unbalance notification.

Next, a procedure for posture unbalance notification will be described with reference to the flowchart shown in FIG. 5. The procedure is executed by the driver monitor ECU 20.

First, whether or not an unbalanced posture has been detected is determined (S10). Namely, whether or not the posture unbalance magnitude L has exceeded the threshold Th is determined. When no unbalanced posture has been detected (S10: NO), processing of S10 is repeated. When an unbalanced posture has been detected (S10: YES), whether or not the detection of the unbalanced posture has been continuous longer than the time T1 is determined (S11). When the detection of the unbalanced posture has not continued longer than the time T1 (S11: NO), processing returns to S10.

When the detection of the unbalanced posture has continued longer than the time T1 (S11: YES), it is determined whether or not the unbalanced posture is a habitual posture of the driver (S12). When the unbalanced posture has been continuously detected longer than the time T1 from immediately after the vehicle was started, it is determined that the unbalanced posture is a habitual posture of the driver (S12: YES). In the present case, "immediately after the vehicle was started" means "within a predetermined amount of time after the shift position was changed from a parking position" or "within a predetermined amount of time after the vehicle was started." The shift position and starting of the vehicle are determined based on values detected by a vehicle sensor 41. When the detection of the unbalanced posture has been continuous longer than the time T1 not from immediately after the vehicle was started but from some time after the vehicle was started, it is determined that the unbalanced posture is other than a habitual posture of the driver (S12: NO).

When the unbalanced posture is determined to be a habitual posture of the driver, it is determined whether or not the vehicle is stopped (S13). To be specific, a determination of whether or not the vehicle speed is V km/h or lower is made based on a value detected by a vehicle sensor 41. The "V km/h" may represent either 0 km/h (vehicle completely stopped) or a speed low enough (e.g. 1 km/h) for the vehicle to be regarded as stopped. When the vehicle is not determined to be stopped (S13: NO), processing of S13 is repeated.

Figure 6:
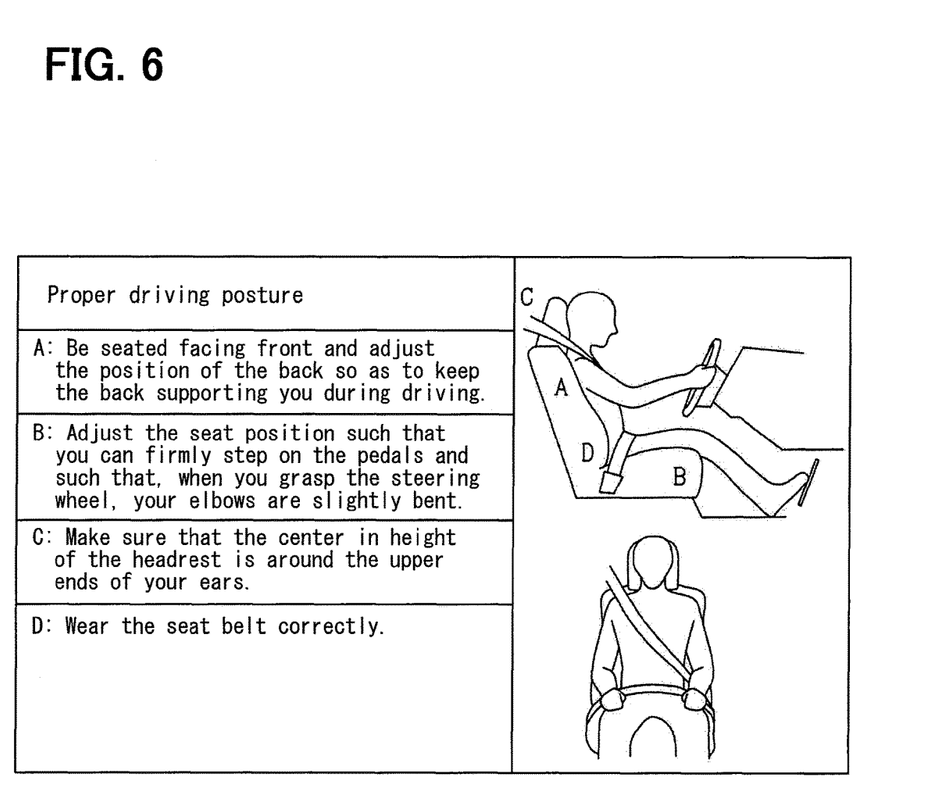
FIG. 6 is a diagram illustrating an example of a proper driving posture to be provided to a driver.

When it is determined that the vehicle is in stop (S13: YES), information about a proper driving posture and effects of the unbalanced posture is outputted (S14). FIG. 6 shows an example of a proper driving posture to be displayed. In the example shown in FIG. 6, illustrations of a proper driving posture are displayed on the display 33 along with steps A to D to be followed to achieve the proper driving posture. The steps A to D are also voice-outputted from the speaker 34. Step A reads, "Be seated facing front and adjust the position of the back so as to keep the back supporting you during driving." Step B reads, "Adjust the seat position such that you can firmly step on the pedals and such that, when you grasp the steering wheel, your elbows are slightly bent." Step C reads, "Make sure that the center in height of the headrest is around the upper ends of your ears." Step D reads, "Wear the seat belt correctly."

Information about effects of an unbalanced posture is displayed on the display 33 and is also voice-outputted from the speaker 34. Examples of information about effects of an unbalanced posture include "Continuing driving in an unbalanced posture will accumulate your fatigue and will increase the physical burden on your body" and "Driving in an unbalanced posture will make your driving operation awkward and will increase chances of causing an accident."

Also, the information to be outputted when a habitual unbalanced posture of a driver is detected may be changed depending on the type of the unbalanced posture. To be specific, the habitual unbalanced posture of a driver may be classified into types, for example, lean-forward, overly relaxed (bent backwards) and leaning against a door and the posture information corresponding to the detected type of unbalanced posture may be outputted.

For use in determining the type of an unbalanced posture, a table in which unbalanced posture types are classified may be prepared and a driver's posture detected by image recognition may be compared with the classified types. An alternative method may also be used to classify unbalanced posture types. Examples of posture information to be outputted for different types of unbalanced postures will be described in the following.

Figure 7A:
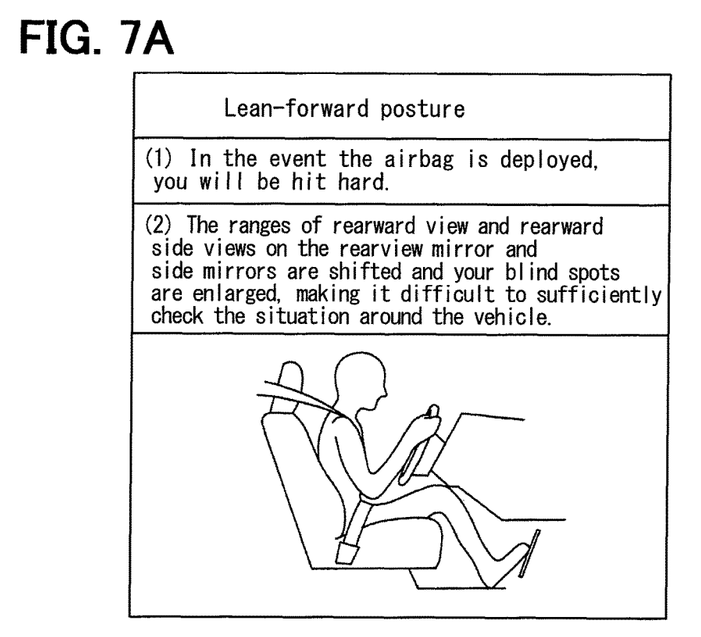
FIG. 7A is a diagram illustrating example effects of an unbalanced posture to be provided to a driver.

For example, when the driver is leaning forward with his/her back off the back of the driver's seat 51 as shown in FIG. 7A, an illustration of a lean-forward posture is displayed on the display 33. This will enable the driver to objectively grasp his/her habitual posture. In addition, the following messages (1) and (2) are displayed on the display 33 as information about effects of the lean-forward posture and are also voice-outputted from the speaker 34. The message (1) reads, "In the event the airbag is deployed, you will be hit hard." The message (2) reads, "The ranges of a rearward view and rearward side views that can be seen on the rearview mirror and side mirrors are shifted to expand your blind spots, making it difficult to sufficiently check the situation around the vehicle." A possible measure which may be taken in this case is to output only the description of step A shown in FIG. 6 as information about a proper driving posture.

Figure 7B:
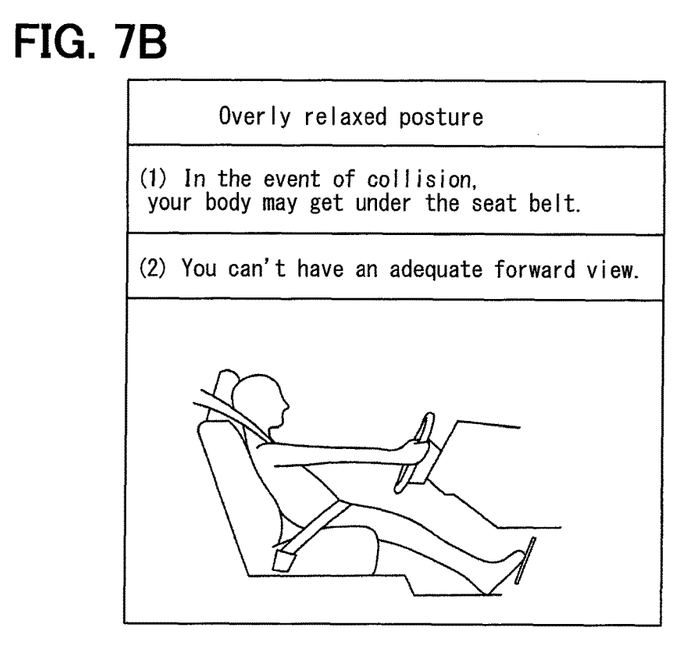
FIG. 7B is a diagram illustrating other example effects of an unbalanced posture to be provided to a driver.

When the driver is in an overly relaxed posture with his/her lower back not in contact with the seat 51, an illustration of an overly relaxed posture as shown in FIG. 7B is displayed on the display 33. In addition, the following messages (1) and (2) are displayed on the display 33 as information about effects of the overly relaxed posture and are also voice-outputted from the speaker 34. The message (1) reads, "In the event of a collision, your body may get under the seat belt." The message (2) reads, "You can't have an adequate forward view." A possible measure which may be taken in this case is to output only the description of step B shown in FIG. 6 as information about a proper driving posture.

When the unbalanced posture is determined to be other than a habitual posture of the driver (S12: NO), the driver is immediately alerted (S15). To be specific, an alarm sound is outputted from the speaker 34. Or, an alarm message, for example, "Have a rest" is displayed on the display 33 and, in addition, the message is voice-outputted from the speaker 34.

Subsequently, whether or not the driver's posture has been improved is determined (S16). When the posture unbalance magnitude L is found to have decreased to be not larger than the threshold Th, the driver's posture is determined to have improved (S16: YES) and processing is terminated.

On the other hand, when the posture unbalance magnitude L is kept being larger than the threshold Th, the driver's posture is determined not to have improved (S16: NO) and whether or not the driver's eyes have been closed longer than the time T2 is determined (S17). Namely, whether or not the driver's eye opening degree has been smaller than the threshold Tho longer than the time T2 is determined.

When the driver's eyes are determined to have been continuously closed longer than the time T2 (S17: YES), an instruction is issued to the vehicle control device 40 to safely stop the vehicle through appropriate braking and steering. Also, to warn vehicles in the vicinity of the dangerous condition, instructions are issued to the vehicle control device 40 to light the headlights and sound the horn. Furthermore, to inform the other passengers of the vehicle about the dangerous condition, an instruction is issued to the speaker 34 to output an alarm sound.

When the driver's eyes are determined not to have been continuously closed longer than the time T2 (S17: NO), whether or not the vehicle is stopped is determined (S19) as in S13. When the vehicle is determined to be stopped (S19: YES), information about a proper driving posture and effects of driving in the unbalanced posture is outputted (S20) as in S14. The processing is then terminated.

The present embodiment described above has the following technical effects.

When an unbalanced posture of a driver is detected based on a camera-captured image, whether or not the unbalanced posture is a habitual posture of the driver is determined. The driver is notified of the unbalanced posture in different manners in accordance with a result of determining whether or not the unbalanced posture is a habitual posture of the driver. In this way, notifications appropriate for the detected unbalanced postures can be given to the driver.

Generally, a habitual unbalanced posture of a driver continues from immediately after driving is started. Therefore, when an unbalanced posture of a driver is continuously detected longer than the time T1 from immediately after driving is started, the unbalanced posture can be determined to be a habitual posture of the driver.

When an unbalanced posture of a driver is determined to be a habitual posture of the driver, posture information is outputted at predetermined timing. When the unbalanced posture of the driver is determined to be other than a habitual posture of the driver, the driver is immediately alerted. Thus, the driver can be given appropriate notifications depending on whether the detected unbalanced posture requires no urgent action to be taken or requires urgent action to be taken.

When an unbalanced posture of a driver is determined to be a habitual posture of the driver, posture information about a proper driving posture or/and information about effects of the unbalanced posture can be outputted to urge the driver to improve his/her driving posture.

When the predetermined timing is set to be when the vehicle is stopped, more information can be safely outputted than when the vehicle is running.

Depending types of habitual unbalanced posture, a difference between a proper driving posture and the habitual unbalanced posture of the driver and the effect of the unbalanced posture vary. Thus, the posture information to be outputted may be determined based on the type of the habitual unbalanced posture of the driver. In this way, the driver can efficiently obtain posture information corresponding to the type of his/her unbalanced posture.

When posture information related with a habitual unbalanced posture of a driver is frequently outputted, the driver may feel annoyed. Therefore, the driver is allowed to set a desired frequency of posture information output. In this way, the driver can obtain posture information at a desired frequency.

In cases where, after an unbalanced posture of a driver is determined to be other than a habitual posture of the driver and the driver is alerted, the driver's posture remains unimproved and his/her eyes are kept closed longer than the time T2, the driver is highly likely unconscious and unable to drive. In such cases, the vehicle is safely stopped to prevent occurrence of an accident.

Other Embodiments

When an unbalanced posture of a driver is determined to be a habitual posture of the driver, posture information may be outputted dividedly at different vehicle stop times. For example, an illustration of a proper driving posture and information about effects of the unbalanced posture may be outputted at different vehicle stop times. Also, when outputting illustrations of a proper driving posture as shown in FIG. 6, the description of steps A to D may be outputted in sequence, for example, such that steps A and B are outputted at a first time when the vehicle is stopped and such that steps C and D are outputted when the vehicle is stopped next time. Outputting the divided posture information at different vehicle stop times enables posture information to be provided to a driver safely. In cases where, in the process of outputting divided posture information at different vehicle stop times, the driver's posture is improved before completion of the process, the output of the remaining posture information may be canceled.

The driver monitoring device 10 may be provided with an external storage device 35 for storing information about the unbalanced posture in association with the driver when the unbalanced posture of the driver is determined to be a habitual posture of the driver. The driver may have an image of his/her habitual driving posture captured by the camera 31 beforehand and may have the captured image stored in the external storage device 35. Then, when a posture of the driver detected by image recognition immediately after driving is started agrees with the information about the driver's habitual driving posture stored in the external storage device 35, the determination unit 22 may determine that the detected posture of the driver is the driver's habitual posture.

Posture information and an alert may be outputted to a driver using either one or both of the display 33 and the speaker 34.

Embodiments and example configurations according to the present disclosure have been illustrated, but the embodiments and configurations according to the present disclosure are not limited to those illustrated above. Embodiments and configurations that can be realized by appropriately combining technical elements disclosed in different embodiments and configurations are also included in the embodiments and configurations according to the present disclosure.

The invention claimed is:

1. A driver monitoring device comprising:
    a detection unit that detects an unbalanced posture of a driver based on an image of a driver's seat of a vehicle captured by a camera;
    a determination unit that determines whether or not the unbalanced posture of the driver detected by the detection unit is a habitual posture of the driver; and
    a notification unit that notifies the driver of the unbalanced posture in different manners in accordance with whether the unbalanced posture determined is the habitual posture of the driver or the unbalanced posture determined is other than the habitual posture of the driver; wherein
    when the unbalanced posture of the driver is detected by the detection unit continuously from immediately after a start of driving longer than a posture unbalance determination threshold time, the determination unit determines that the unbalanced posture is the habitual posture of the driver.

2. The driver monitoring device according to claim 1, wherein:
    when the determination unit determines that the unbalanced posture is the habitual posture of the driver, the notification unit outputs posture information at a predetermined timing; and
    when the determination unit determines that the unbalanced posture is other than the habitual posture of the driver, the notification unit immediately alerts the driver.

3. The driver monitoring device according to claim 2, wherein:
    the posture information includes at least information about a proper driving posture or information about an effect of the unbalanced posture.

4. The driver monitoring device according to claim 2, wherein:
    the predetermined timing is when the vehicle is stopped.

5. The driver monitoring device according to claim 4, wherein:
    the notification unit outputs the posture information dividedly at a plurality of times at each which the vehicle is stopped.

6. The driver monitoring device according to claim 2, wherein:
    the notification unit outputs the posture information contents of which are changed in accordance with how the driver's habitual posture is unbalanced.

7. The driver monitoring device according to claim 2, further comprising:
    a setting unit that allows the driver to set a frequency at which the posture information is outputted.

8. The driver monitoring device according to claim 2, further comprising:
    an opening degree calculation unit that calculates a degree of opening of an eye of the driver; and
    a vehicle stopping unit that, when the driver's posture is not improved after the driver is alerted by the notification unit with the driver's eye opening degree calculated by the opening degree calculation unit having been continuously smaller than an opening degree threshold exceeding an opening degree determination threshold time, outputs a signal for safely stopping the vehicle to a vehicle control device.

* * * * *